May 1, 1951 E. J. WAY 2,550,739

MICROPHOTOGRAPHIC DEVICE

Filed Aug. 27, 1948

INVENTOR
ELWOOD J. WAY
BY Ray C. Hackley, Jr.
ATTORNEY

Patented May 1, 1951

2,550,739

UNITED STATES PATENT OFFICE 2,550,739

MICROPHOTOGRAPHIC DEVICE

Elwood J. Way, Washington, D. C.

Application August 27, 1948, Serial No. 46,521

1 Claim. (Cl. 88—24)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to photographic copying, and more particularly to a method of and means for copying records whereby additional information is added to appear in the reproduction.

It is frequently necessary to add new information or indicia to records, which records may be in the form of original records or photographic copies thereof. Photographic records are usually negative microphotographic records carried on a strip of film; however, positive prints are occasionally used as working media. Where the records to be altered are voluminous, it is desirable to provide a system for adding the new material as efficiently and with as little handling as is possible.

It is an object of this invention to provide a method for photographically adding new indicia to records.

It is an object of this invention to provide means for photographically adding new indicia to records.

It is a further object of this invention to provide a device for photographing a projected image of the record along with a portion of a tape bearing new indicia to be added to the record.

Other objects and advantages will become apparent from the following specification taken in connection with the accompanying drawing, in which—

Figure 1:
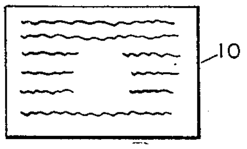
Fig. 1 represents an original record.

Fig. 1 shows an original record 10 which may be a card bearing handwritten information. It will be assumed that it is desired to add additional indicia to the card 10, such as a name in printed characters at the top of the card, to facilitate filing and selection. This method is of greatest advantage when there are many records such as card 10 to which the new indicia is to be added.

Figure 2:
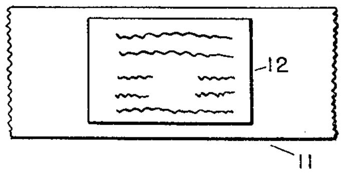
Fig. 2 shows a microphotograph of the original record.

The cards 10 are first microphotographed on a film strip 11, as seen in Fig. 2. Of course, if the record to be altered is already on a microphotographic film strip, then this first step may be omitted. Record 10 now appears as a photographic impression 12 on the strip 11. It will be understood that the strip 11 and representation 12 have been shown to be relatively large with respect to the original record 10 for the purpose of clarity. Actually, the microphotographic representation 12 is usually much smaller than the original record 10. It will be understood that a great number of the original records 10 may be photographed in succession on the film 11.

Figure 3:
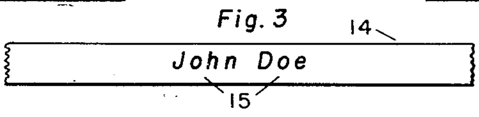
Fig. 3 shows a tape bearing new indicia to be added to the original record.

The new indicia 15 to be added to the records 10 is placed on a continuous tape 14, as seen in Fig. 3, preferably by a typewriting machine. Tape 14 is translucent and preferably is a paper tape. The tape 14 carries a set of new indicia for each of the records 10 on film strip 11, and in the same sequence.

Figures 4, 5:
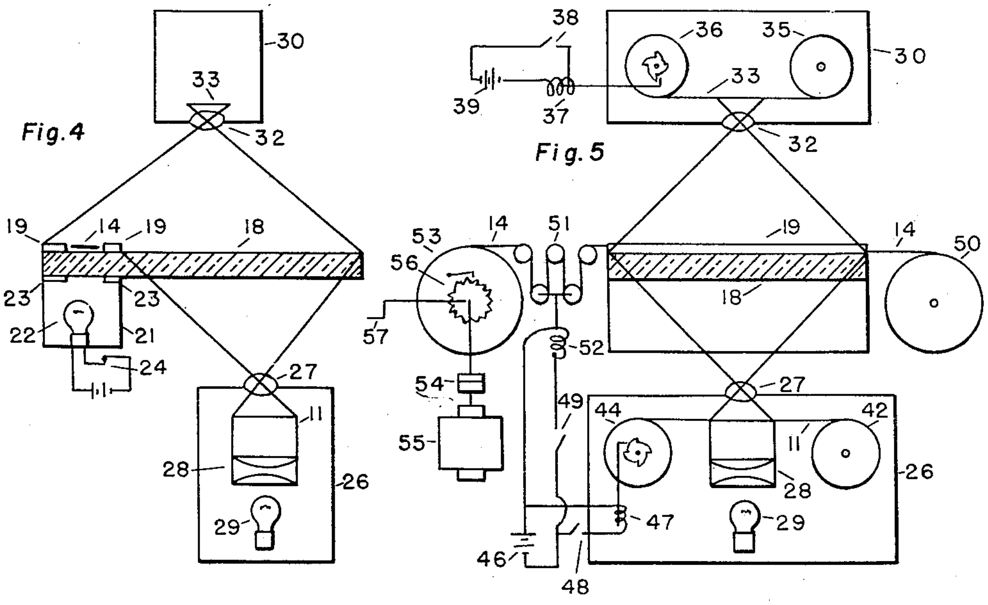
Fig. 4 is a schematic side view of a device embodying the principles of this invention.
Fig. 5 is a schematic front view of the device shown in Fig. 4.

Figs. 4 and 5 show the apparatus by which a composite picture is made of the original record 12 as it appears on film strip 11 with the new indicia 15 as it appears on the tape 14. A translucent screen 18 is provided which preferably is of glass with a sanded top. A projector 26 has a light source 29, the light from which is collimated by condenser 28, projected through film 11 and focused by lens 27 on the sanded top of the screen 18. Film 11 runs from storage reel 42 in projector 26 to take-up reel 44. The film 11 is advanced in steps by means of a solenoid 47 energized by battery 46 selectively through switch 48.

Adjacent to the image of film 11 cast by the projector 26 are tape guides 19, between which runs the tape 14. Guides 19 are transparent and are preferably made of glass. A light-box 21 under the screen 18 and the tape 14 contains light source 22 which illuminates the translucent tape 14. The intensity of light source 22 may be varied by means of rheostat 24. Masks 23 are placed under screen 18, one being directly under each of the guides 19 to restrict the amount of light passing through the transparent guides 19. A camera 30 is provided containing film 33, fed from storage reel 35 to take-up reel 36. A lens 32 focuses an image of the screen 18 and tape 14 on film 33. A shutter mechanism (not shown) is also provided, as is well known in the art. Film 33 is advanced by solenoid 27, energized from battery 39 selectively by switch 38.

Paper tape 14 bearing new indicia 15 is fed from storage reel 50, between the guides 19, through tape advance mechanism 51 to take-up reel 53. The tape advancing mechanism 51 is selectively operated by switch 49 from battery 46. Take-up reel 53, which is under a continuous torque applied by continuously rotating motor 55 through friction clutch 54, has a ratchet 56 to prevent the film from being pulled backwards and handle 57 to allow proper positioning of tape 14.

Figure 6:
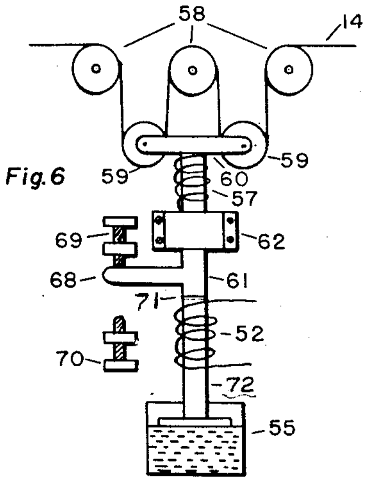
Fig. 6 is a detailed front view of the tape advancing device shown schematically in Fig. 5.

The tape advancing mechanism shown in detail in Fig. 6 comprises three stationary idler rollers 58 and two movable rollers 59 carried by arm 60 on the top of shaft 61. Shaft 61, which is slidably held by guide bracket 62, is preferably of magnetic material and has fixed to its lower end, starting at junction 71, a continuation 72 of a non-magnetic material. The lower end of shaft 72 carries the piston of dashpot 55. An electrical coil 52 surrounds the shaft 72 at a point adjacent the magnetic shaft 61. The tape 14 is threaded over the stationary rollers 58 and under the movable rollers 59. Shaft 61 carries an arm 68 which, with screws 69 and 70, provides adjustable limits to the extreme upper and lower movement of the rollers 59—59. The amount of film moved by one operation of solenoid 52 is thus adjustable.

It will be seen that when solenoid 52 is energized from battery 46 by action of switch 49, that the magnetic shaft 61 will be drawn into solenoid 52 and rollers 59 will be pulled downwardly. When rollers 59 move downwardly, tape 14 cannot withdraw from take-up reel 53 because of the ratchet stop mechanism incorporated therein. Accordingly, on the downward movement of rollers 59 tape 14 is pulled from storage reel 50 and through the guides 19—19. Tape 14 on each operation of solenoid 52 is pulled as advanced by an amount which is four times the downward movement of the rollers 59.

When solenoid 52 is deenergized, rollers 59 return upwardly through action of spring 57. The slack amount of tape produced by the upward motion of rollers 59 is taken up by the take-up reel 53, upon which a continuous forward torque is exerted by motor 55 and friction clutch 54. It will be understood that the torque produced on take-up reel 53 by motor 55 and clutch 54 is not sufficient to pull the tape 14 from storage reel 50 between the guides 19 and through take-up mechanism 51. It will be obvious that a tape-gripping mechanism operating to release the tape 14 only upon energization of solenoid 52 may be included if necessary. Such a tape-gripping mechanism could be a film grip released by an auxiliary solenoid connected in parallel with solenoid 52.

In the operation of the device shown in Figs. 4 and 5 the microphotographic strip 11 is placed in projector 26 on storage reel 42 and threaded into take-up reel 44. The tape 14 bearing the new indicia in the same sequence in which the records have been placed on film 11 are placed on drum 50 and led through guides 19 through advancing mechanism 51 to take-up reel 53. Unexposed photographic film 33 is placed in camera 30 in storage reel 35 and threaded into take-up reel 36.

One of the records 12 on strip 11 is projected on screen 18. Tape 14 is then adjusted so there appears between the guides 19 the proper new indicia corresponding with the record 12 being projected on the screen 18. The rheostat 24 is adjusted to a suitable value. The shutter of camera 30 is then operated to photographically impress on the film 33 a composite picture of the image of original record 12 being projected on screen 18 along with the new indicia 15 carried by the tape 14.

Tape advancing mechanism 51 is then operated by manual operation of switch 49. The sets of new indicia 15 carried by tape 14 are spaced by the amount that mechanism 51 advances the tape 14 at each operation. Thus operation of switch 49 results in the appearance of the next set of new indicia 15 between the guides 19. By operation of switch 48, microphotographic film 11 is also advanced to project the next record 12 on the screen 18. Switch 38 is also operated to advance film 33 for the next exposure. Preferably the shutter and film advancing mechanism of camera 30 are interconnected so that a single manipulation exposes film 33 and advances it in position to receive the next exposure. It will be understood that film 33 and camera 30 are preferably adapted to take microphotographs. The shutter of camera 30 is again operated to take the next composite picture.

Since the sequence of original records 12 on film strip 11 corresponds to the sequence of indicia 15 carried by tape 14, it is only necessary to advance tape 14 and film 11 one step between each exposure. It will be obvious that solenoids 37, 52 and 47 could be connected so as to be operated by the closing of a single switch.

Figure 7:
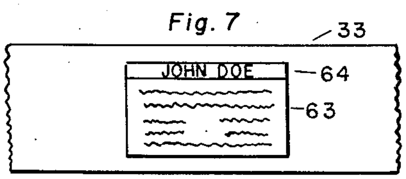
Fig. 7 shows a microphotograph of the original record with the new indicia.
Figure 8:
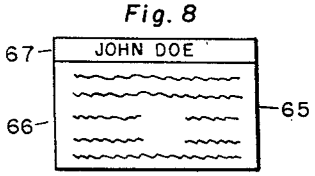
Fig. 8 shows the new record containing the original information and the new indicia.

Fig. 7 shows, relatively enlarged, the microphotographic developed film strip 33 which now bears a positive (black on white) representation 63 of original record 10 and a negative representation 64 (black on white) of the new indicia 15. From the film 33 a print 65 is now made, as seen in Fig. 8, which bears a negative 66 of the original record 10 and a positive 67 of the new indicia 15.

It will be seen that this invention provides a method by which a great number of records may be easily altered instead of recopying each of the entire original records 10. Only the new indicia 15 is produced by manual operation. The rest of the method produces with very little manual operation, the new record 65 bearing the new indicia.

In the practice of this invention it is particularly advantageous to cause the size of the characters in the new indicia 64 on the film 33 to be large relative to the size of the characters in the representation 63 of the original information. This allows adjustment of the size of the print 65 so that the index name 67 is large relative to the script 66 of the old information, a desirable relation since the index name 67 is used much more frequently than the script 66. The relatively large size of the new indicia 64 on film 33 is produced conveniently by placing relatively large characters on the tape 14.

Under some conditions it may be preferable to place each set of new indicia within the field of the camera 30 on a separate carrying medium rather than on a single tape. If each of the sets of new indicia is already on a separate card, it might be advantageous to place each card bearing the new indicia along the edge of screen 18 as the corresponding record is projected thereon by projector 26.

The method described above is useful in many types of work and under various circumstances.

Let it be supposed that an index to a volume or a series of volumes has been recorded on a film, it is now desired to index the volume or volumes published subsequently and make such index references useable concurrently with the original film index; that is, place them between original items so that the combined lot is in alphabetical sequence. The method substantially as described above can be used to accomplish this result by placing the supplemental items properly on the tape 14 and preparing a new film 33.

Alternatively, let it be supposed that it is desired to prepare punch cards based on records which have been microphotographed and that the information to be punched is too complex to permit punching directly from the projected image without the intervention of a coding operation. Under these circumstances the images are projected on the ground glass screen successively and at the same time suitable code figures are written on the paper strip. The film images and the code figures may be checked for accuracy by another person prior to their simultaneous recording on the secondary film 33, which will serve subsequently as punching media.

It will be understood that the method and means described above are exemplary only and that many changes and modifications will occur to those skilled in the art within the scope of the appended claim.

What is claimed is:

In combination, a screen, a strip on which are photographically recorded a plurality of original records in a certain sequence, means for intermittently moving said strip and for successively projecting said records on said screen, a tape marked with a plurality of sets of indicia, each set of indicia pertaining to one of said records, said sets of indicia being placed in a sequence on said tape corresponding to the sequence of said records on said strip, guide means guiding said tape past said screen and in close proximity to the record image projected thereon, means for illuminating said tape, means operated by a solenoid for intermittently moving said tape to place different sets of indicia beside said projected image, a source of energizing potential connected to said solenoid through a switch, means for producing a composite photographic record of said strip and said image.

ELWOOD J. WAY.

REFERENCES CITED

The following references are of record in the file of this patent:

UNITED STATES PATENTS

| Number | Name | Date |
|---|---|---|
| 813,808 | Loryea | Feb. 27, 1906 |
| 1,270,778 | Brixey | July 2, 1918 |
| 1,801,458 | Satterlee | Apr. 21, 1931 |
| 2,210,090 | Lutz | Aug. 6, 1940 |
| 2,250,442 | Abell | July 29, 1941 |